(12) United States Patent
Vikram

(10) Patent No.: US 8,402,177 B2
(45) Date of Patent: Mar. 19, 2013

(54) INFERRING HOST STORAGE TOPOLOGY

(75) Inventor: Krishnamurthy Vikram, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/171,782

(22) Filed: Jun. 29, 2011

(65) Prior Publication Data

US 2013/0007305 A1  Jan. 3, 2013

(51) Int. Cl.
 G06F 3/00 (2006.01)
 G06F 5/00 (2006.01)
 G06F 13/00 (2006.01)
(52) U.S. Cl. ............ 710/17; 710/16; 710/38; 710/316
(58) Field of Classification Search .............. 710/16, 710/17, 38, 316
See application file for complete search history.

(56) References Cited

U.S. PATENT DOCUMENTS

| 6,873,597 | B1 * | 3/2005 | King .................... 370/235 |
| 6,886,053 | B2 | 4/2005 | Paul |
| 7,194,538 | B1 | 3/2007 | Rabe et al. |
| 7,275,103 | B1 * | 9/2007 | Thrasher et al. ......... 709/224 |
| 7,548,924 | B2 | 6/2009 | Watanabe |
| 2005/0198186 | A1 | 9/2005 | Griv |
| 2009/0077268 | A1 | 3/2009 | Craddock et al. |
| 2010/0293349 | A1 | 11/2010 | Lionetti et al. |

* cited by examiner

Primary Examiner — Farley Abad
(74) Attorney, Agent, or Firm — Jack H. McKinney

(57) ABSTRACT

A processor implemented method for inferring storage topology of a host includes discovering, from a security group that contains an initiator port of the host, all initiator ports of the host and all target ports of a storage device. Identification is then made of a port in the security group through which access to the storage device is blocked. From the discovered ports not identified as blocked, available paths between the host and a volume exposed to the host by the storage device are detected.

20 Claims, 4 Drawing Sheets

64 — DISCOVER, FROM A SECURITY GROUP THAT CONTAINS AN INITIATOR PORT OF THE HOST, ALL INITIATOR PORTS OF THE HOST AND ALL TARGET PORTS OF A STORAGE DEVICE

66 — IDENTIFY, FROM THE DISCOVERED INITIATOR AND TARGET PORTS, A PORT THROUGH WHICH ACCESS TO THE STORAGE DEVICE IS BLOCKED

68 — DETECT, FROM THE DISCOVERED PORTS NOT IDENTIFIED AS BLOCKED, AVAILABLE PATHS BETWEEN THE HOST AND A VOLUME EXPOSED TO THE HOST BY THE STORAGE DEVICE

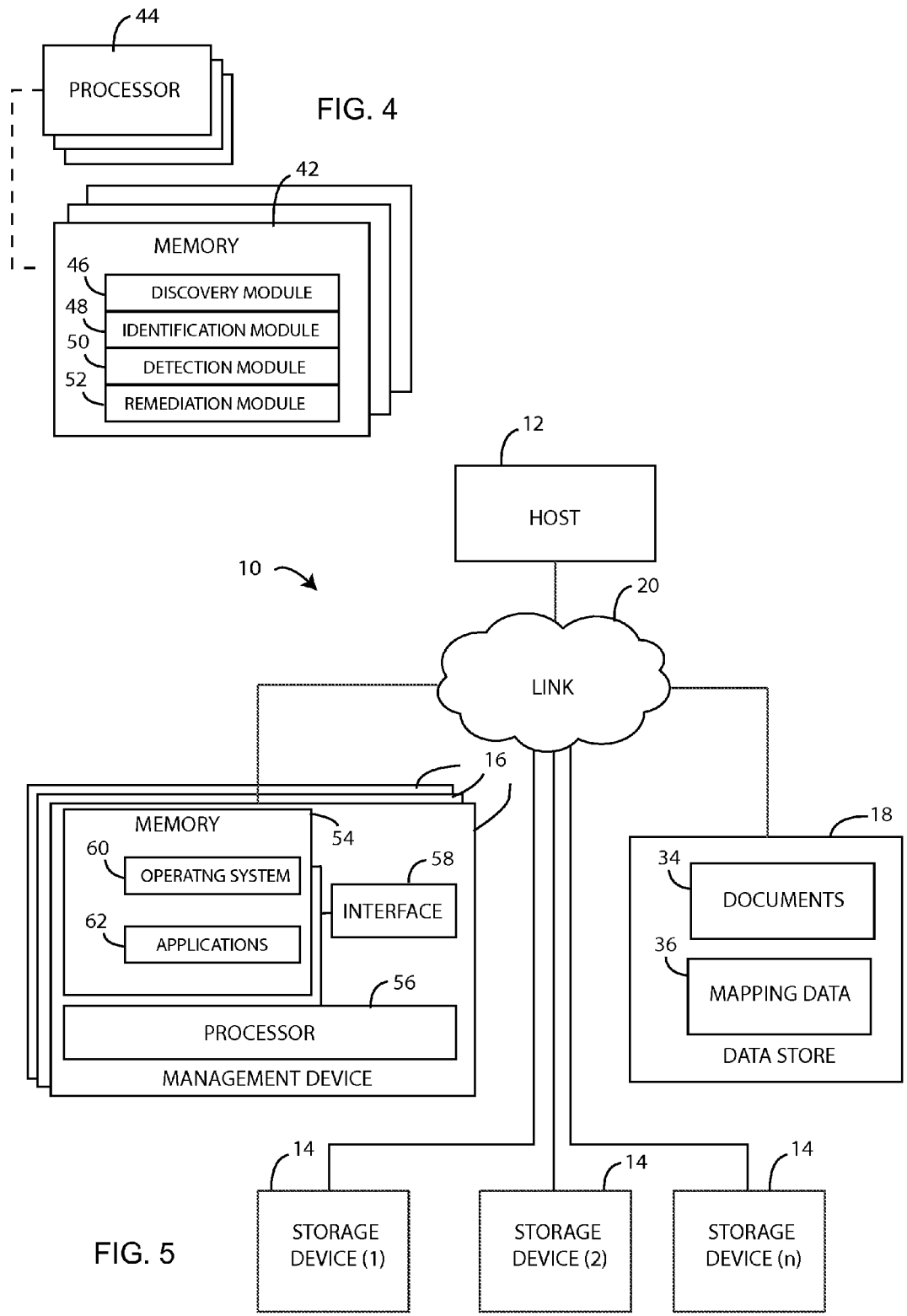

INFERRING HOST STORAGE TOPOLOGY

BACKGROUND

A storage network may include many paths between a host and a storage volume exposed to the host by a storage device within the network. Those paths represent the logical storage paths or drives available to the host. In other words, the paths represent the host's storage topology. Awareness of a host's storage topology can be important to managing the network. For example, an administrator may want to ensure that multiple paths exist between a host and a volume to reduce or avoid downtime should any one path fail. In a data centers having multiple hosts and storage devices, identifying the topologies is not a simple task. Manual and agent based approaches become time consuming and costly as the number of hosts and storage devices increase.

DRAWINGS

FIG. 4 is a block diagram depicting a memory and a processor according to an embodiment.

FIG. 5 is a block diagram depicting the physical and logical elements of a server device configured to implement the system of FIG. 3 according to an embodiment.

DETAILED DESCRIPTION

Introduction:

Various embodiments described below were developed in an effort to infer the topology of a host in a storage network. That inferred topology can then be used to evaluate the storage network. Such evaluations can include determining whether a sufficient number of paths exist between the host and a volume in order to avoid or reduce downtime should a failure occur in the network.

In particular, embodiments described below operate to discover, from a security group that contains an initiator port of the host, all initiator ports of the host and all target ports of a storage device. From the discovered initiator and target ports, a port is discovered through which access to the storage device is blocked. From the discovered ports not identified as blocked, available paths are discovered between the host and a volume exposed to the host by the storage device.

As used herein, "storage device" refers to a device through which a volume exposed by the storage device to a host may be accessed. A storage device may be a storage array through which multiple volumes may be accessed. A volume, referred to a logical unit in some storage environments, is an identifiable unit of electronic storage space. That space may represent all or a portion of the available storage space on a storage component such as a disk, tape, or solid state drive. The space may also span multiple such storage components. The term "host" as used herein refers to a device or system which hosts information or provides services for other systems. A host may be connected to a variety of network elements including storage devices. For example, a host may serve an application that relies on data storage provided by one or more volumes exposed to the host by one or more storage devices.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
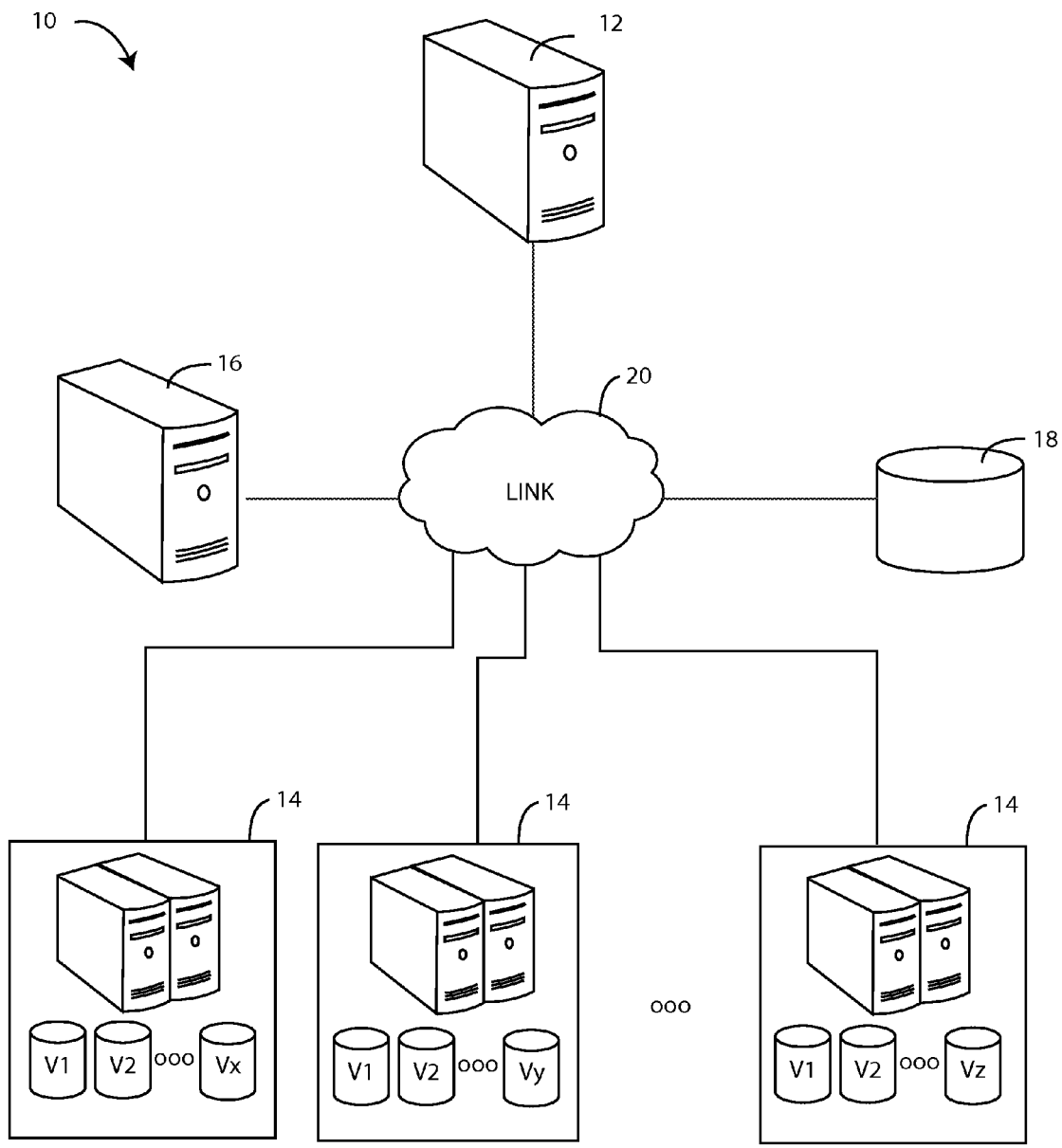
FIG. 1 depicts an environment in which various embodiments may be implemented.

Environment:

FIG. 1 depicts an environment 10 in which various embodiments may be implemented. Environment 10 is shown to include host 12, storage devices 14, management device 16, and data store 18. Host 12 represents generally any computing device configured to provide services consumed by other devices (not shown). For example, host 12 may function as an application server. While shown as a single computing device, the functions of host 12 may be distributed across multiple computing devices.

Each storage device 14 represents generally a computing device configured to expose one or more volumes to host 12. In the example of FIG. 1, one storage device is capable of exposing (x) volumes, another (y) volumes, and another (z) volumes.

Management device 16 represents generally a computing device configured to infer the topology of host 12. As discussed in more detail below, that topology includes the paths available to host 12 for accessing a volume exposed to host 12 by a given storage device 14. Data store 18 represents generally any memory containing data utilized by management device 16 in the performance of its functions. In the example of FIG. 1 management device 16 is depicted as a single device. However, the functions of management device may be distributed across multiple computing devices. While memory store 18 is depicted as a separate, single memory structure, memory store 18 may include multiple memory structures and may be partially or entirely integrated into one or more of host 12, storage devices 14, and management device 16.

Link 20 represents generally one or more of a cable, wireless, fiber optic, or remote connections via a telecommunication link, an infrared link, a radio frequency link, or any other connectors or systems that provide electronic communication between components 12-18. Link 20 may include, at least in part, an intranet, the Internet, or a combination of both. Link 20 may also include intermediate proxies, routers, switches, load balancers, and the like. With respect to host 12 and storage devices 14, link 12 may serve as more or more network fabrics. A network fabric is a network where nodes connect with each other using network switches. The switches may be crossbar switches connected in a pattern similar to threads in a textile fabric. The network fabric may include devices compatible with the Fibre Channel (FC) protocol adapted for storage networking.

Figure 2:
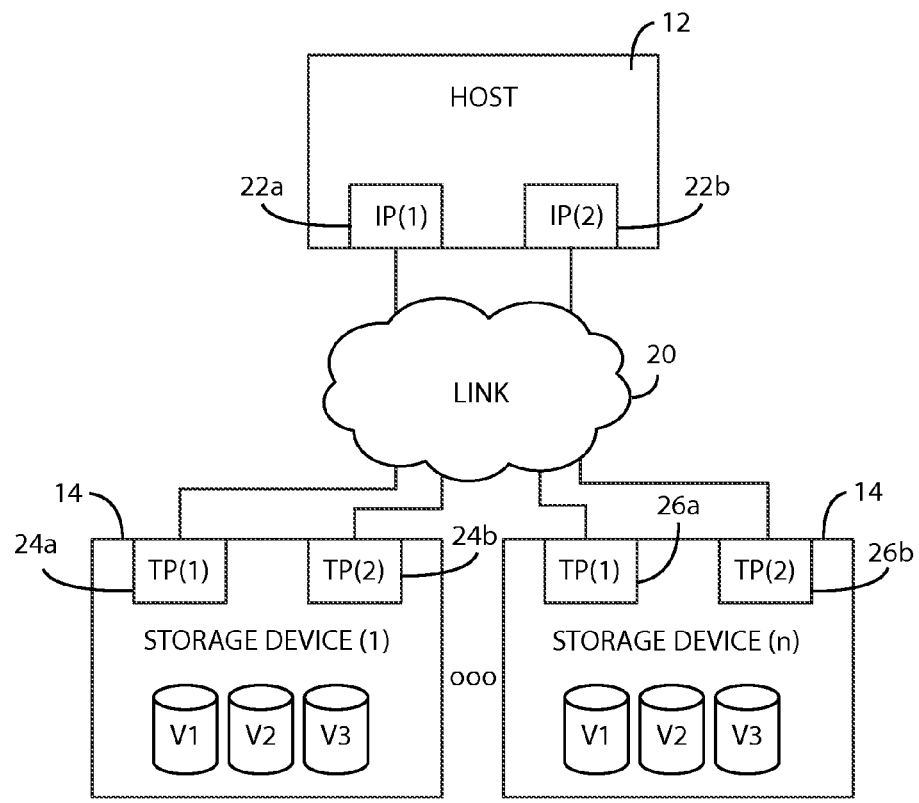
FIG. 2 is a block diagram depicting initiator ports of a host and target ports of a plurality of storage devices according to an embodiment.

FIG. 2 depicts host 12 in communication with (n) storage devices 14 via link 20. Communication between host 12 and a given storage device 14 is initiated via a port on host 12 and targeted to a port on the particular storage device 14. In the example of FIG. 2, host 12 is depicted as having to initiator ports 22a and 22b. Storage device (1) 14 is shown to include two target ports 24a and 24b. Storage device (n) 14 is shown to include two target ports 26a and 26b. It is noted, however, that host 12 may be configured with any number of initiator ports and each storage device 14 may be configured with any number of target ports.

Each storage device 14 is shown as being configured to expose three volumes to host 12. With two available initiator ports on host 12 and two available target ports on a given storage device 14, four possible paths exist between host 12 and a given volume. Using volume (V1) of storage device (1) 14 as an example, the four paths can be defined as:

IP(1)—TP(1)—V1
IP(1)—TP(2)—V1
IP(2)—TP(1)—V1
IP(2)—TP(2)—V1

Storage device (1) 14 may, however, be configured not to expose the volume V1 via all four paths. For example, port 22b (IP2) of host 12 might be blocked or zoned out. This would leave two paths:

IP(1)—TP(1)—V1
IP(1)—TP(2)—V1

Figure 3:
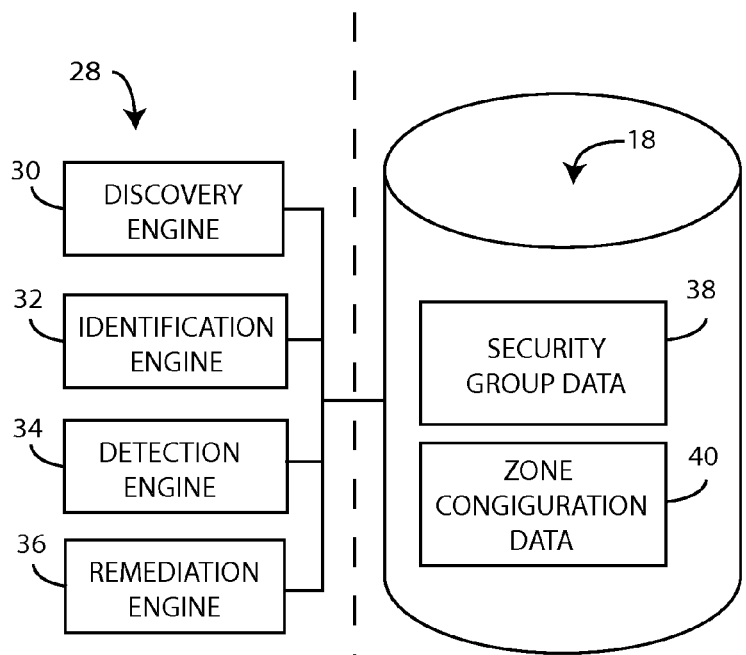
FIG. 3 depicts a system for inferring a host storage topology according to an embodiment.

Components:

FIGS. 3-5 depict examples of physical and logical components for implementing various embodiments. FIG. 3 depicts system 28 for inferring a host storage topology. In the example of FIG. 3, system 28 includes discovery engine 30, identification engine 32, detection engine 34, and remediation engine 36. It is noted that engines 32, 34, and 36 can perform their respective functions, discussed below, without interacting with the host whose topology is being inferred.

Discovery engine 30 represents generally any combination of hardware and programming configured to identify security groups that contain an initiator port of a host whose topology is to be inferred. A security group is configuration data that identifies the initiator ports of a given host and the target ports of a storage device that is exposing one or more volumes to the host, Each security group may be stored in data store 18 as security group data 38.

In operation, discovery engine 30 scans security group data 38 for security groups that contain an initiator port belonging to the host in question. From those groups, discovery engine 30 is configured to discover all initiator ports of the host and all target ports of the corresponding storage devices. In other words, discovery engine 30 is configured to recognize a plurality of security groups, each group containing an initiator port of the host. From those recognized groups, discovery engine 30 is configured to discover all initiator ports of the host and all target ports of a plurality of storage devices. As discussed above, these ports can be used to infer the possible paths via which the storage devices may expose volumes to the host.

Identification engine 32 represents generally any configuration of hardware and programming configured to identify, from the discovered initiator and target ports, ports through which access to a storage device is blocked. A blocked port may be an initiator port of the host or a target port of a given storage device. In operation, identification engine 32 may identify multiple blocked ports that limit the available paths between the host and the corresponding storage devices. The blocked ports, in the example of FIG. 3, may be identified by accessing zoning configuration data 40 in data store 18. Zoning configuration data 40, for example, may represent active zone data for a storage network that includes the host and the storage devices in question.

Detection engine 34 represents generally any combination of hardware and programming configured to detect, from the discovered ports not identified as blocked, available paths between the host and volumes exposed to the host by the corresponding storage devices. In the example noted above, the number of unblocked host initiator ports and storage device target ports determines the number of different available paths though which a given volume may be exposed to the host. Typically, as the number of unblocked ports increases, the risk of downtime from a network failure decreases.

Remediation engine 36 represents generally any combination of hardware and programming configured to examine the available paths detected by detection engine 34 to determine the number of available paths between the host and each corresponding volume. Remediation engine 36 is also configured to take remedial action if the determined number paths between the host and a given volume fall below a threshold. Such remedial action, for example, may include causing an increase the number of available paths between the host and that volume. The paths may be increased, for example, by causing a port identified as blocked by identification engine 32 to be freed. Such may be accomplished by altering zoning configuration data 40. Remedial engine 36 may accomplish this task by altering configuration data 40 or communicating information that results in configuration data 40 being altered. By ensuring that the number of available paths exceeds the threshold, remediation engine 36 helps reduce the risk of downtime due to a network failure.

In foregoing discussion, various components were described as combinations of hardware and programming. Such components may be implemented in a number of fashions. Looking at FIG. 4, the programming may be processor executable instructions stored on tangible memory media 42 and the hardware may include a processor 44 for executing those instructions. Memory 42 can be said to store program instructions that when executed by processor 44 implement system 28 of FIG. 3. Memory 42 may be integrated in the same device as processor 44 or it may be separate but accessible to that device and processor 76. In the example of FIG. 4, memory is shown to include detection module 46, identification module 48, detection module 50, and remediation module 52. Each module 46-52 represents program instructions that, when executed, implement a corresponding engine 30-36 of FIG. 3. For example, the execution of module 56 by processor 44 implements discovery engine 46.

In one example, the program instructions stored in memory 42 can be part of an installation package that can be executed by processor 44 to implement system 28. In this case, memory 42 may be a portable medium such as a CD, DVD, or flash drive or a memory maintained by a server from which the installation package can be downloaded and installed. In another example, the program instructions may be part of an application or applications already installed. Here, memory 42 can include integrated memory such as a hard drive or a solid state drive, RAM, or ROM, As a further example, FIG. 5 depicts a block diagram illustrating various physical and logical elements of management device 16 of FIG. 1. Management device 16 is shown to include memory 54, processor 56, and interface 58. Processor 56 represents generally any processor configured to execute program instructions stored in memory 54 to perform various specified functions. Interface 58 represents generally any wired or wireless interface enabling management device 16 to communicate via link 20. Memory 54 is shown to include operating system 60 and applications 62. Operating system 60 represents a collection of programs that when executed by processor 56 serve as a platform on which applications 62 can run. Examples of operating systems include, but are not limited, to versions of Microsoft's Windows® and Linux®. Applications 62 represent program instructions for various functions of management device 16. Such instructions relate to functions such as inferring a storage topology for host 12.

Looking at FIG. 3, engines 30-36 are described as combinations of hardware and programming. The hardware portions may, depending on the embodiment, be implemented as processor 56. The programming portions, depending on the embodiment can be implemented by operating system 60, applications 62, or combinations thereof.

Figure 6:
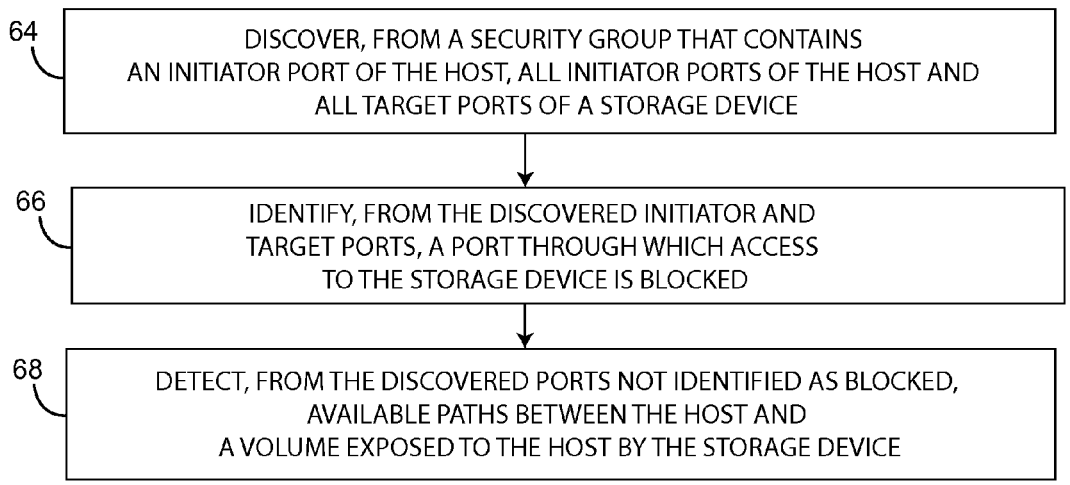
FIG. 6 is a flow diagram depicting steps taken to implement an embodiment.

Operation:

FIG. 6 is an exemplary flow diagram of steps taken to implement an embodiment in which the storage topology of a host can be inferred. In discussing FIG. 6, reference may be made to the diagrams of FIGS. 1-5 to provide contextual examples. Implementation, however, is not limited to those examples. FIG. 6 depicts a series of steps executes by a processor resource. A processor resource is a processor or a group of processors configured to execute program instructions. A group of processors may be integrated in a common computing device or distributed across computing devices. A processor resource is used to perform a task when it executes program instructions to implement that task. With respect to FIG. 6, the processor resource is used to implement the following steps, From a security group that contains an initiator port of a host under consideration, all initiator ports of the host and all target ports of a storage device are discovered (step 64). Referring to FIG. 3, discovery engine 30 may be responsible for implementing step 64. Looking at FIG. 4, discovery module 46 may represent the program instructions that when executed implement step 64. Step 64 may include recognizing a plurality of security groups where each group contains an initiator port of the host. From the recognized plurality of security groups, all initiator ports of the host and all target ports of a plurality of storage devices may be discovered.

From the initiator and target ports discovered in step 64, a port is identified through which access to the storage device is blocked (step 66). Step 66 may include identifying multiple ports through which access to multiple storage devices is blocked. Referring to FIG. 3, identification engine 32 may be responsible for implementing step 66. Looking at FIG. 4, identification module 48 represents program instructions that when executed implement step 66.

Continuing with FIG. 6, from the discovered ports not identified as blocked in step 66, available paths between the host and a volume exposed to the host by the storage device are detected (step 68). Step 68 can include detecting available paths between the host and a plurality of volumes exposed to the host by the plurality of storage devices. Referring to FIG. 3, detection engine 34 may be responsible for implementing step 68. Looking at FIG. 4, detection module 50 may represent the program instructions that when executed implement step 68.

It is noted that steps 64, 66, and 68 can e accomplished without interacting with the host through, for example, the use of agents installed on the host or any other remote access method such as SSH or telnet. As a consequence, remediation and other topology management can be more efficiently performed as the storage network increases in size. By avoiding host interaction, administrative overhead may be reduced even as the size of the managed environment grows. For example, the method depicted in FIG. 6 may continue with an examination of the available paths detected in step 68 to determine the number of available paths between the host and a given volume. Topology management in the form of a remedial action may be performed if the determined number of paths between the host and a particular volume does not exceed a threshold number. Such a remedial action can include increasing the number of paths by freeing ports identified as blocked in step 66. Referring to FIG. 3, remediation engine 36 may perform these functions and, with respect to FIG. 4, remediation module 52 may represent the corresponding program instructions.

Conclusion:

FIGS. 1-6 aid in depicting the architecture, functionality, and operation of various embodiments. In particular, FIGS. 2-6 depict various physical and logical components. Various components illustrated in FIGS. 2 and 6 are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 6 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A processor implemented method for inferring storage topology of a host, the method comprising utilizing a processor resource to:
   discover, from a security group that contains an initiator port of the host, all initiator ports of the host and all target ports of a storage device;
   identify, from the discovered initiator and target ports, a port through which access to the storage device is blocked;
   detect, from the discovered ports not identified as blocked, available paths between the host and a volume exposed to the host by the storage device;
   determine the number of available paths between the host and that volume; and
   increase the number of paths available between the host and the volume when the determined number of available paths falls below a threshold.

2. The method of claim 1, comprising utilizing the processor resource to examine the available paths to determine the number of available paths between the host and the volume.

3. The method of claim 2, comprising utilizing the processor resource to take remedial action if the determined number falls below a threshold.

4. The method of claim 1, wherein the using the processor resource to discover, identify and detect comprises using the processor resource to discover, identify, and detect without interacting with the host.

5. The method of claim 1, comprising recognizing a plurality of security groups, each group containing an initiator port of the host, and wherein:
utilizing the processor resource to discover comprises utilizing the processor to discover, from the recognized plurality of security groups, all initiator ports of the host and all target ports of a plurality of storage devices;
utilizing the processor resource to identify comprises utilizing the processor to identify, from the discovered initiator and target ports, ports through which access to the plurality of storage devices is blocked; and
utilizing the processor resource to detect comprises utilizing the processor to detect, from the discovered ports not identified as blocked, available paths between the host and a plurality of volumes exposed to the host by the plurality of storage devices.

6. The method of claim 5, comprising utilizing the processor resource to:
for each of the plurality of volumes, determine the number of available paths between the host and that volume; and
take remedial action with respect to one or more of the plurality of volumes for which the determined number of available paths falls below a threshold.

7. The method of claim 6, wherein utilizing the processor resource to take remedial action comprises utilizing the processor resource to increase the number of paths available between the host and the volume.

8. A computer readable medium having instructions stored thereon that when executed cause a processor resource to:
discover, from a security group that contains an initiator port of the host, all initiator ports of the host and all target ports of a storage device;
identify, from the discovered initiator and target ports, a port through which access to the storage device is blocked;
detect, from the discovered ports not identified as blocked, available paths between the host and a volume exposed to the host by the storage device;
determine the number of available paths between the host and that volume; and
increase the number of paths available between the host and the volume when the determined number of available paths falls below a threshold.

9. The medium of claim 8, wherein the instructions include instructions that when executed cause the processor resource to examine the available paths to determine the number of available paths between the host and the volume.

10. The medium of claim 9, wherein the instructions include instructions that when executed cause the processor resource to take remedial action if the determined number falls below a threshold.

11. The medium of claim 8, wherein the instructions include instructions that when executed cause the processor resource to discover, identify and detect without interacting with the host.

12. The medium of claim 11, wherein the instructions include instructions that when executed cause the processor resource to:
recognize a plurality of security groups, each group containing an initiator port of the host;
to discover, from the recognized plurality of security groups, all initiator ports of the host and all target ports of a plurality of storage devices;
identify, from the discovered initiator and target ports, ports through which access to the plurality of storage devices is blocked; and
detect, from the discovered ports not identified as blocked, available paths between the host and a plurality of volumes exposed to the host by the plurality of storage devices.

13. The medium of claim 12, wherein the instructions include instructions that when executed cause the processor resource to:
for each of the plurality of volumes, determine the number of available paths between the host and that volume; and
take remedial action with respect to one or more of the plurality of volumes for which the determined number of available paths falls below a threshold.

14. The medium of claim 13, wherein the instructions include instructions that when executed cause the processor resource to take remedial action by increasing the number of paths available between the host and the volume.

15. A system for inferring storage topology of a host, the system comprising a discovery engine, an identification engine, a detection engine, and a remediation engine wherein:
the discovery engine is configured to discover, from a security group that contains an initiator port of the host, all initiator ports of the host and all target ports of a storage device;
the identification engine is configured to identify, from the discovered initiator and target ports, a port through which access to the storage device is blocked;
the detection engine is configured to detect, from the discovered ports not identified as blocked, available paths between the host and a volume exposed to the host by the storage device; and
the remediation engine is configured to, determine the number of available paths between the host and the volume, and cause an increase in the number of paths available between the host and the volume when the determined number of available paths falls below a threshold.

16. The system of claim 15, further comprising a remediation engine configured to:
examine the available paths to determine the number of available paths between the host and the volume; and
take remedial action if the determined number falls below a threshold.

17. The system of claim 15, wherein the discovery engine, identification engine, and detection engine are configured to perform their respective tasks without interacting with the host.

18. The system of claim 15, wherein:
the discovery engine is configured to recognize a plurality of security groups, each group containing an initiator port of the host and to discover, from the recognized plurality of security groups, all initiator ports of the host and all target ports of a plurality of storage devices;
identification engine is configured to identify, from the discovered initiator and target ports, ports through which access to the plurality of storage devices is blocked; and
the detection engine is configured to detect, from the discovered ports not identified as blocked, available paths between the host and a plurality of volumes exposed to the host by the plurality of storage devices.

19. The system of claim 18, wherein the remediation engine is configured to:
    for each of the plurality of volumes, determine the number of available paths between the host and that volume; and
    take remedial action with respect to one or more of the plurality of volumes for which the determined number of available paths falls below a threshold.

20. The system of claim 19, wherein the remediation engine is configured to take remedial action by causing an increase in the number of paths available between the host and the volume.

* * * * *